(12) United States Patent
Miklitsch (10) Patent No.: US 9,306,406 B2
(45) Date of Patent: Apr. 5, 2016

(54) CHARGING DEVICE WITH REMOVABLE INSERT (71) Applicant: Jason J Miklitsch, Lake Villa, IL (US)

(72) Inventor: Jason J Miklitsch, Lake Villa, IL (US)

(73) Assignee: Jason J. Miklitsch, Lake Villa, IL (US)

( * ) Notice: Subject to any disclaimer, the term of this patent is extended or adjusted under 35 U.S.C. 154(b) by 514 days.

(21) Appl. No.: 13/897,543

(22) Filed: May 20, 2013

(65) Prior Publication Data

US 2014/0339895 A1    Nov. 20, 2014

(51) Int. Cl.
*H02J 7/00*   (2006.01)

(52) U.S. Cl.
CPC .............. *H02J 7/0047* (2013.01); *H02J 7/0042* (2013.01); *H02J 7/0054* (2013.01); *H02J 7/0055* (2013.01); *H02J 7/0068* (2013.01); *Y10T 307/25* (2015.04); *Y10T 307/406* (2015.04)

(58) Field of Classification Search
CPC ......... H05B 37/029; F21S 4/001; F23Q 7/00; H01G 2/00; B60L 1/14; H02J 7/0042; H02J 7/0047; H02J 7/0054; H02J 7/0055; H02J 7/0068; Y10T 307/25; Y10T 307/406
USPC ........................................................ 307/157
See application file for complete search history.

(56) References Cited

U.S. PATENT DOCUMENTS

| | | | |
|---|---|---|---|
| D506,279 S | 6/2005 | Nalwad | |
| D527,477 S | 8/2006 | Chen | |
| 7,175,310 B1 * | 2/2007 | Cotterell | G06F 3/0395 362/253 |
| D541,797 S | 5/2007 | Chen | |
| D615,587 S | 5/2010 | Wang | |
| D629,806 S | 12/2010 | Ho | |
| 2004/0071410 A1 | 4/2004 | Ma | |
| 2010/0002421 A1 | 1/2010 | Arnold, III | |
| 2010/0309657 A1 | 12/2010 | Purdy | |
| 2012/0318779 A1 * | 12/2012 | Juarez | H01R 33/22 219/209 |

OTHER PUBLICATIONS

Mr. Brightside product description page (accesesible at http://www.staples.com/Mr-Brightside-USB-Light-Black/product_761830?cid=CSE:GoogleBase:Pcs_%2F_Drives%2F_Accessories:Laptop_Locks_%26_Lights:761830: GP035-000-00).

(Continued)

*Primary Examiner* — Thienvu Tran
*Assistant Examiner* — Brian K Baxter
(74) *Attorney, Agent, or Firm* — McDonnell Boehnen Hulbert & Berghoff LLP (57) ABSTRACT Disclosed herein is a charging device. In one embodiment, the device includes a base unit that forms bottom and side surfaces, a top unit that forms a top surface of the apparatus, the top unit including a user-removable insert, the user-removable insert comprising a substantially transparent portion and a substantially opaque portion, one or more light emitters positioned within the base unit and configured for emitting light through the substantially transparent portion of the user-removable insert, a first male electrical plug protruding from the base unit and configured to couple to a first external device, a first female electrical receptacle recessed substantially within the base unit and configured to couple to an external power source, and power electronics coupled to the one or more light emitters, the first male electrical plug, and the first female electrical receptacle, the power electronics being configured to deliver electricity from the external power source to the first external device and the one or more light emitters.

20 Claims, 5 Drawing Sheets

(56) References Cited

OTHER PUBLICATIONS

Cables to Go product description page (accessible at http://www.amazon.com/Cables-Go-29590-Illuminated-Orange/dp/B000234SW6).

Desk FX product description (accessible at http://pichaus.com/ion-illuminated-audio-light-@cfeb1e01912ba806bad6f7ae1fb5f8c2/). Collection of screen shots depicting various products (Apr. 5, 2013).

\* cited by examiner

CHARGING DEVICE WITH REMOVABLE INSERT

BACKGROUND

Unless otherwise indicated herein, the information described in this section is not admitted to be prior art by inclusion in this section.

Today, mobile communication devices, such as cellular phones and tablet computers are commonplace. Such devices generally consume a great deal of power, and as a result, tend to need charging quite often. Charging devices are typically included with the purchase of a mobile device. However, they tend to be generic and non-customizable. Accordingly, it would be advantageous to provide a commercially appealable, customizable charging device.

SUMMARY

Disclosed herein are embodiments of a charging device. In one embodiment, the device includes a base unit that forms bottom and side surfaces, a top unit that forms a top surface of the apparatus, the top unit including a user-removable insert, the user-removable insert comprising a substantially transparent portion and a substantially opaque portion, one or more light emitters positioned within the base unit and configured for emitting light through the substantially transparent portion of the user-removable insert, a first male electrical plug protruding from the base unit and configured to couple to a first external device, a first female electrical receptacle recessed substantially within the base unit and configured to couple to an external power source, and power electronics coupled to the one or more light emitters, the first male electrical plug, and the first female electrical receptacle, the power electronics being configured to deliver electricity from the external power source to the first external device and the one or more light emitters.

In another embodiment, the device includes a disc-shaped top unit that forms a top surface of the apparatus, the top unit including (a) a user-removable insert comprising a substantially transparent portion and a substantially opaque portion, (b) one or pressure clips configured to lock onto a corresponding portion of the user-removable insert, and (c) a depressable portion, which when depressed, operates to manipulate the one or more pressure clips to release the user-removable insert, a base unit that forms bottom and side surfaces of the apparatus, the side surface being substantially cylindrical, the side surface including a groove that retains at least one lip of the top unit and prevents the top unit from detaching from the base and allows the top unit to rotate within the base unit, the at least one lip of the top unit being positioned on vertical clips extending down from the top unit, one or more light emitters positioned within the base unit and configured for emitting light through the substantially transparent portion of the user-removable insert; the one or more light emitters including a first array of substantially white light emitting diodes (LEDs) and a second array of colored LEDs, a toggling device coupled to the first array and the second array, the toggling device being configured for selectively actuating either or both of the first array and the second array, a first male electrical plug protruding from the base unit and configured to couple to a first external device, the first male electrical plug being a type of male Universal Serial Bus (USB) plug, the type being selected from the group consisting of: Type A, Type B, Mini-A, Mini-B, Micro-A, and Micro-B, a plug housing surrounding a radial portion of the first male electrical plug, wherein the plug housing allows the first male electrical plug to rotate about its axis within the plug housing, an illuminable portion of the side surface of the base unit configured to radiate light emitted from the one or more light emitters within the base unit onto the first male electrical plug, a first female electrical receptacle recessed substantially within the base unit and configured to couple to an external power source, the first female electrical receptacle being a type of female USB receptacle, the type being selected from the group consisting of: Type A, Type B, Mini-A, Mini-B, Micro-A, and Micro-B, and power electronics coupled to the one or more light emitters, the first male electrical plug, and the first female electrical receptacle, the power electronics being configured to deliver electricity from the external power source to the first external device and the one or more light emitters, wherein the power electronics include one or more of the following: a voltage regulator, a voltage divider circuit, and a power inverter circuit.

These, as well as other aspects, advantages, and alternatives will become more apparent to those of ordinary skill in the art by reading the following detailed description, with reference where appropriate to the accompanying drawings. Further, it should be understood that the description provided in this summary section and elsewhere in this document is intended to describe the method and apparatus by example only and not by way of limitation.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 1:
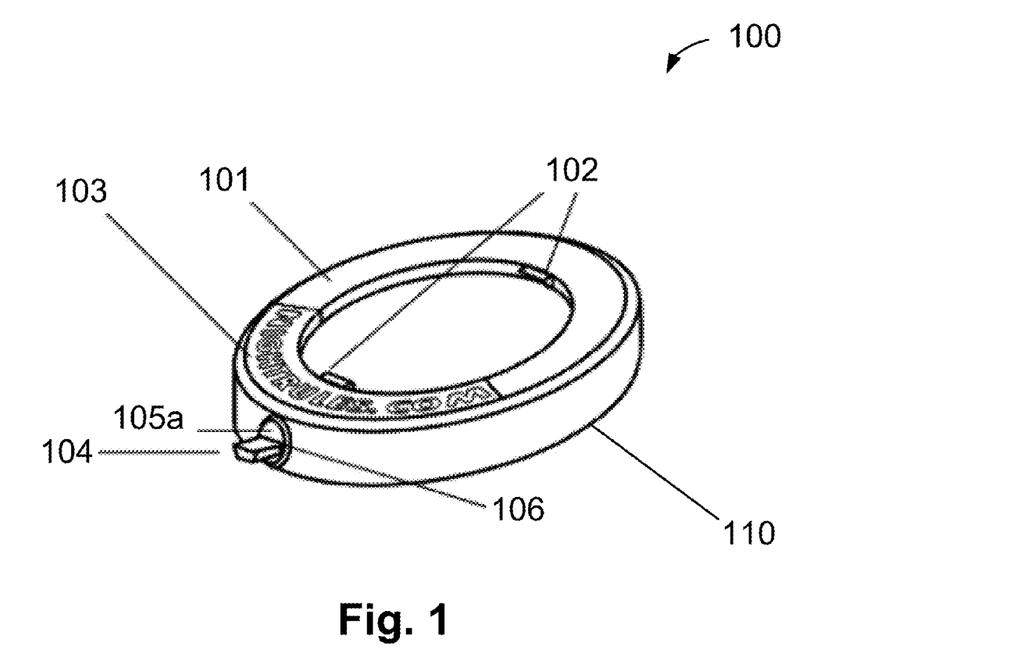
FIG. 1 depicts an example charging device, in accordance with an embodiment.
Figure 2:
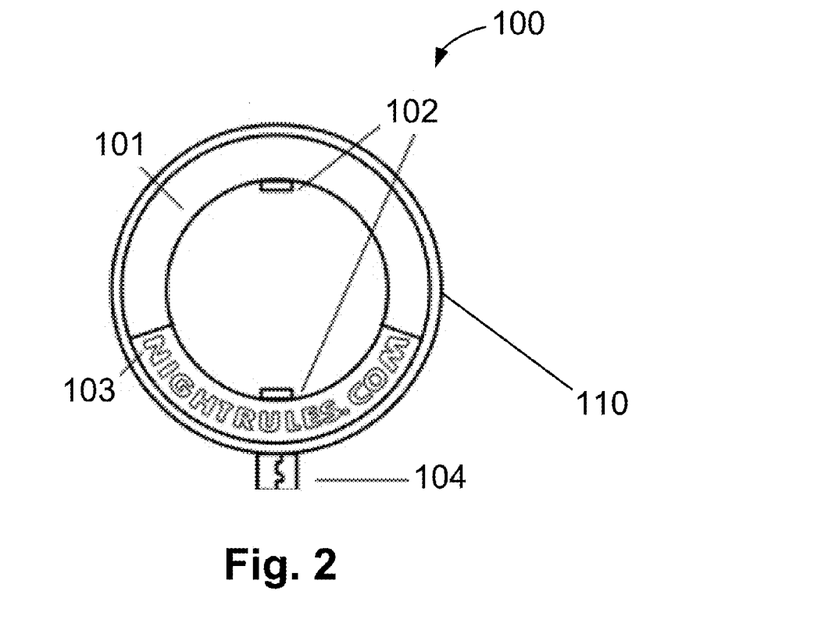
FIG. 2 depicts an example charging device, in accordance with an embodiment.

In accordance with one embodiment of the present disclosure, FIG. 1 depicts an isometric view of select components of an example charging device 100, and FIG. 2 depicts a top view of the select components of the example charging device 100. As depicted in FIGS. 1 and 2, the charging device 100 includes a base 110, which in some embodiments is made from a molded polymeric material. Although the base 110 is depicted as being circular in FIG. 1, other bases of other charging devices in other embodiments may be differently shaped.

The base 110 includes at least one aperture 105a with an electrical connector 104 protruding therefrom. The electrical connector 104 may be a male plug, such as a Universal Serial Bus (USB) Type A, Type B, Mini-A, Mini-B, Micro-A, Micro-B, or any other male plug now known or later developed. Electrical connector 104 is generally configured to couple to an electronic device, such as a cell phone or tablet computer.

Surrounding the aperture may be an illuminable ring 106, which in some embodiments is made from a substantially transparent polymeric material. For example, as discussed further herein, in some embodiments, the charging device 100 may include one or more arrays of one or more light emitting diodes (LEDs) positioned within the base. The LED array may emit light though the ring 106, thereby illuminating the ring 106.

As further depicted, the charging device 100 also includes a rotatable top piece 101 positioned within the base. The top piece has pressure clips 102 that enable the top piece 101 and the base to receive a removable insert. Generally, a removable insert (as described further herein with respect to FIG. 6) fits into the negative space defined by top piece 101 and is secured by the clips 102. The top piece 101 may also include a release button 103, which when depressed manipulates at least one of the clips 102 such that the removable insert positioned in the negative space defined by top piece 101 may be removed.

Figure 3:
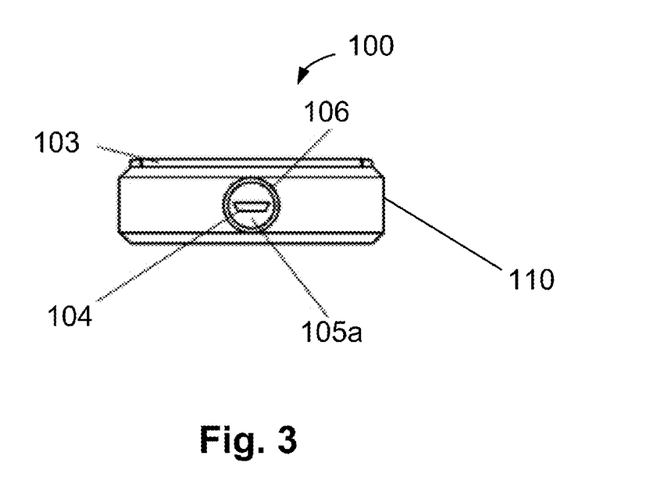
FIG. 3 depicts an example charging device, in accordance with an embodiment.

FIG. 3 depicts a front view of the charging device 100, in accordance with one embodiment. This view depicts the base 100, release button 103 of the top piece 101, electrical connector 104, aperture 105a, and illuminable ring 106. In some embodiments, the aperture 105a includes a socket that enables the electrical connector 104 to be rotatably mounted within the base 110. In this way, the electrical connector 104 may be rotated up to 360° in order to match the configuration of a corresponding electrical receptacle on an electrical device, such as a cell phone or tablet computer.

Figure 4:
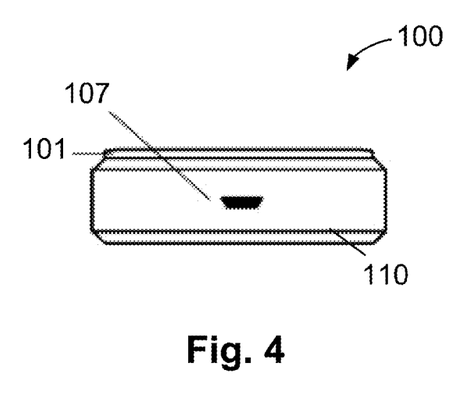
FIG. 4 depicts an example charging device, in accordance with an embodiment.

FIG. 4 depicts a rear view of the charging device 100, in accordance with one embodiment. This view depicts the base 110, top piece 101, and second electrical connector 107. The electrical connector 107 may be a female receptacle configured to receive a corresponding male plug, such as a Universal Serial Bus (USB) Type A, Type B, Mini-A, Mini-B, Micro-A, Micro-B, or any other type of male plug now known or later developed. In practice, the electrical connector 107 may receive a cable that is coupled to an electrical power source, such as a wall receptacle.

Figure 5:
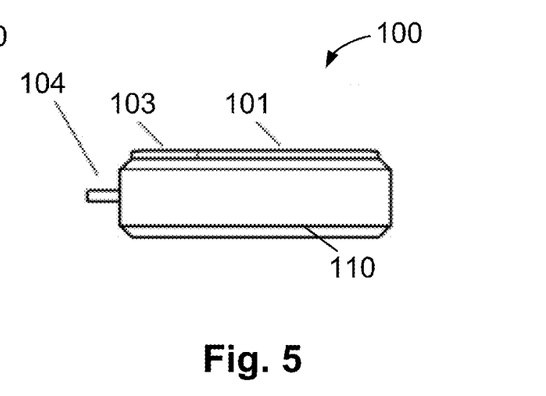
FIG. 5 depicts an example charging device, in accordance with an embodiment.

FIG. 5 depicts a side view of the charging device 100, in accordance with one embodiment. This view depicts the base 110, top piece 101, release button 103, and electrical connector 104. As depicted, the electrical connector 104 (e.g., a male plug) is protruded slightly from the base 110 so that the electrical connector 104 may be received by a corresponding female receptacle on an external device, such as a cell phone or tablet computer.

Figure 6:
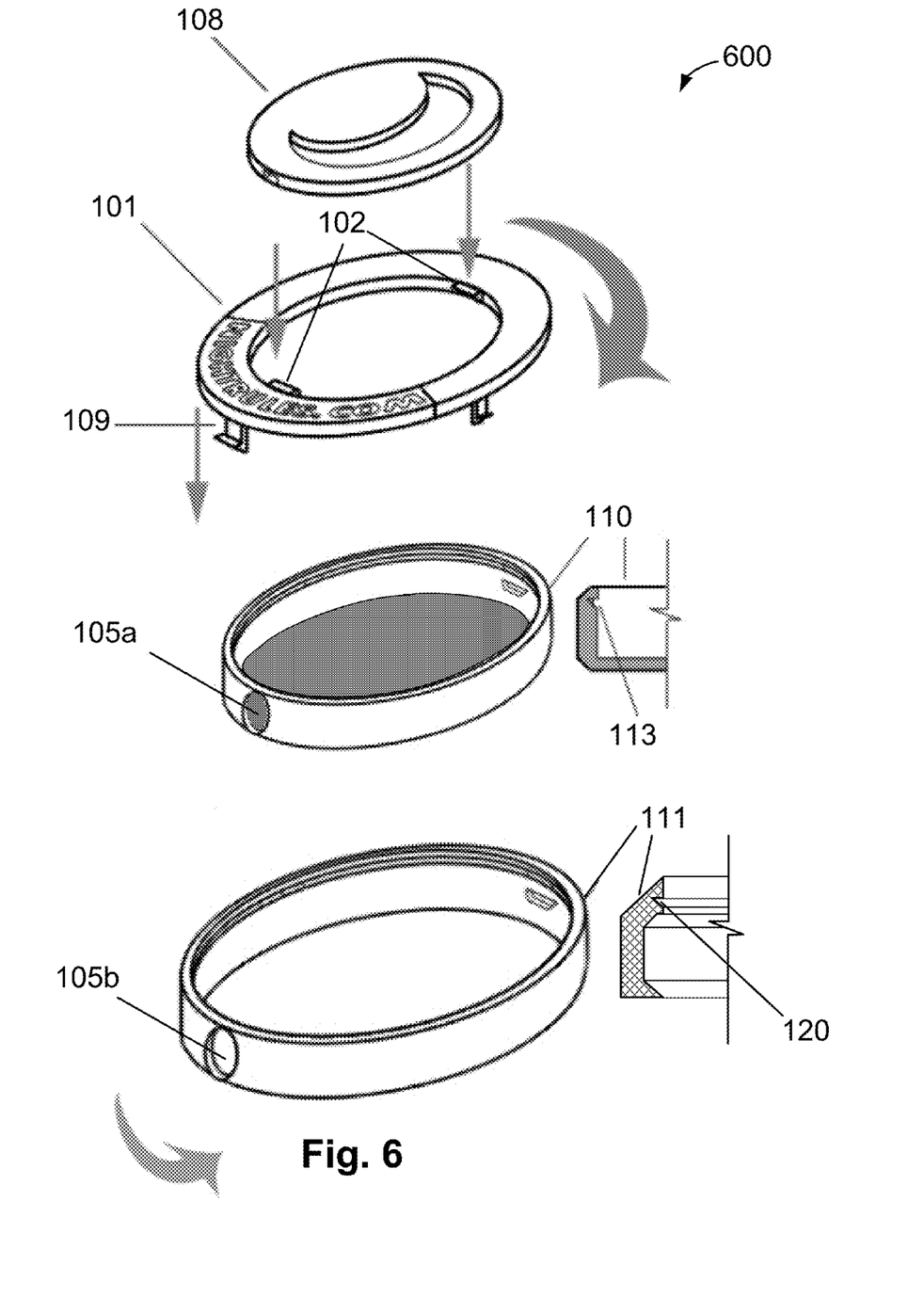
FIG. 6 depicts example charging device components, in accordance with an embodiment.

FIG. 6 depicts an exploded view of several component pieces 600 that may be included with charging device 100, in accordance with one embodiment. As depicted, the component pieces 600 include a removable insert 108, a top piece 101 with pressure clips 102 and vertical clips 109, a base 110, and an optional annular ring 111 Generally, the removable insert 108 may be made from a molded polymeric material and have a substantially opaque portion and a substantially transparent portion. For example, as depicted in FIG. 6, the substantially transparent portion of removable insert 108 is a cut-out of the insert in the shape of crescent moon, whereas the substantially opaque portion is the remainder of the removable insert 108. Notably, in other embodiments, other cut-out shapes and other arrangements of transparent and opaque portions of a removable insert are possible. The substantially transparent portion may consist of the same material as the substantially opaque portion, a different material than the substantially opaque portion, or it may be negative space of the removable insert 108.

As depicted, the base 110 has a cavity, in which the electrical connector 104, electrical connector 107, LEDs (FIG. 10) and other power electronics (FIG. 10) reside. Base 110 is also depicted as having a groove 113 for receiving the vertical clips 109 of the top piece 101.

The charging device 100 may also include a rotatable annular ring 111, which may be mounted on the base 110 via any suitable mounting apparatus. For example, the annular ring 111 may be a cylindrical ring captured by circumferential protrusions on the base 110, or the annular ring 111 may include circumferential protrusions that capture the base 110. As depicted in FIG. 6, the annular ring 111 includes an aperture 105b and a groove 120 for receiving the vertical clips 109 of the top piece 101. In embodiments in which the base 110 includes more than one electrical connector, the annular ring 111 may be rotatable about the base 110 in order to selectively reveal the desired electrical connector through the aperture 105b.

As further depicted, the top piece 101 is configured to releasably receive the removable insert 108 via the pressure clips 102. In practice, when the top piece 101 and removable insert 108 are positioned on the base 110, light emitted from LEDs positioned in the base 110 may be emitted through the substantially transparent portion of the removable insert 108. Further, the top piece 101 also includes vertical clips 109 in order to couple the top piece to the base and/or an annular ring that may be positioned about the base, such as annular ring 111. In some embodiments, the top piece 101 can rotate 360° within the base 110, and in further embodiments lock at 90° increments. In other embodiments, other configurations of top piece 101 are possible as well.

Figure 7:
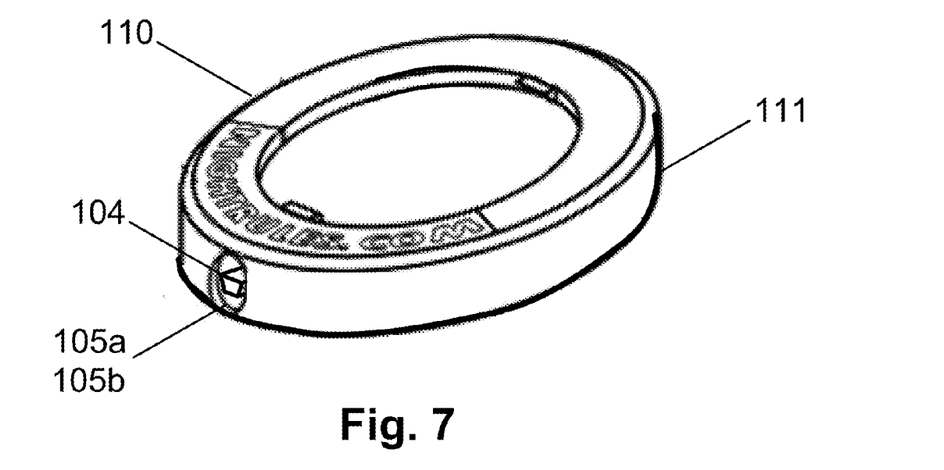
FIG. 7 depicts an example charging device, in accordance with an embodiment.
Figure 8:
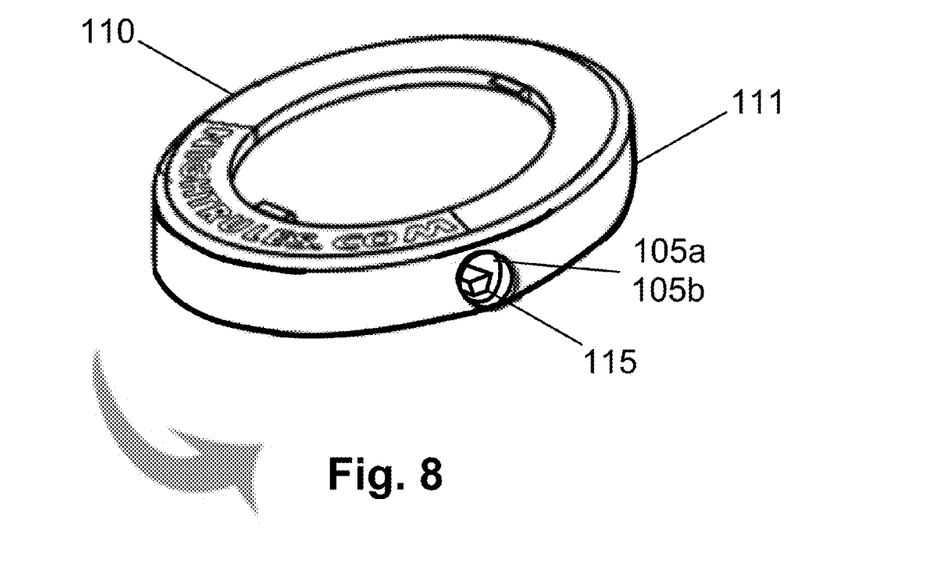
FIG. 8 depicts an example charging device, in accordance with an embodiment.

FIGS. 7 and 8 depict the rotation of the annular ring 111 about the base 110, in accordance with one embodiment. In particular, FIG. 7 depicts the base 110 with the annular ring 111 positioned so as to reveal electrical connector 104 through apertures 105a and 105b. As depicted, in this embodiment, the electrical connector 104 is recessed within the base 110. This allows for the rotation of the annular ring 111 without hindrance from the electrical connector 104. When it is desired to couple electrical connector 104 to an external device, the electrical connector 104 may protrude from the apertures 105a and 105b. For example, when the annular ring 111 is rotated to reveal the electrical connector 104 through aperture 105b, a spring within the base 100 may cause the electrical connector 104 to move from its recessed position within the base 110 to a position where it protrudes from the aperture 105b. And when it is desired to rotate the annular ring 111 in order to reveal another electrical connector, the electrical connector 104 may be manipulated to retreat into the base 110, such as by pushing it in. Other configurations are possible as well.

FIG. 8 depicts the annular ring 111 rotated about 90° from its position in FIG. 7 so as to reveal a second electrical connector 115 through a second aperture in the base 110 and the aperture 105b. The electrical connector 115 may be different than electrical connector 104. For instance, electrical connector 104 may be a male USB Micro A plug, whereas electrical connector 115 is a male USB Mini A plug. Other configurations are possible as well.

Figure 9:
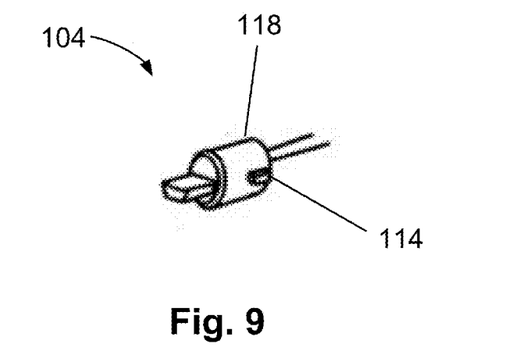
FIG. 9 depicts example charging device components, in accordance with an embodiment.

FIG. 9 depicts a portion of an electrical connector 104. As mentioned, the electrical connector may be a male plug configured to couple to an external device, such a cell phone or tablet computer. In some embodiments, the electrical connector 104 may be positioned in a socket of the base 110 in such a way so that the electrical connector 104 is rotatable within the socket. For instance, the electrical connector 104 may have one or more wings 114 on a housing 118 of the connector 104. The wings 114 may be received in a corresponding grooved portion of the socket of base 110 and allow for rotation of the connector 104 within the socket. Other configurations are possible as well.

Figure 10:
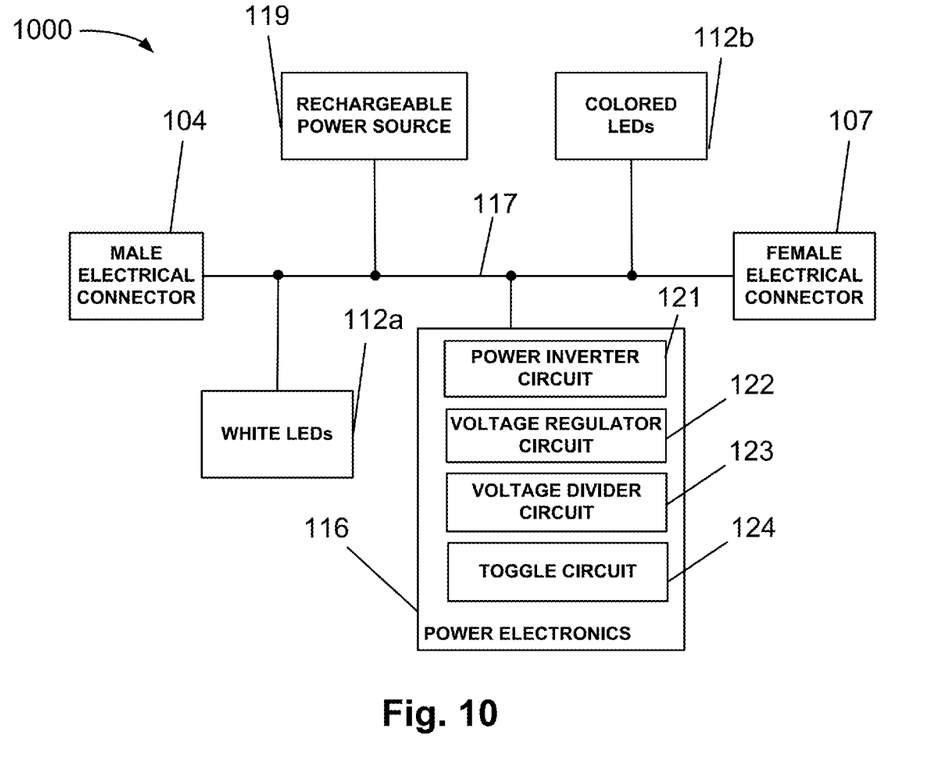
FIG. 10 depicts example charging device components, in accordance with an embodiment.

FIG. 10 depicts an example block diagram depicting certain electrical components 1000 that may be included in charging device 100 and, for example, positioned within the base 110. In one embodiment, for instance, components 1000 include a male electrical connector 104, a female electrical connector 107, an array of white LEDs 112a, an array of colored LEDs 112b, a rechargeable power source 119, and power electronics 116, all coupled together by a bus 117 or other mechanism. In some embodiments, the LEDs 112a-b may be positioned within the base in such a way so as to emit light through the substantially transparent portion of a removable insert and perhaps other portions of the base 110, such as the aperture 105a, and illuminable ring 106. In addition, the corresponding male plug received by the female electrical connector 107 is a cable that may be coupled to an external power source (not shown), such as a 5V DC power source or a 120V AC power source.

Further, electrical components 1000 include power electronics 116, which are configured for receiving electricity from an external power source via electrical connector 107 and delivering electricity to the LEDs 112a-b and the male electrical connector 104 via the bus 117 or other mechanism. This arrangement enables the electrical connector 104 to provide electricity to an external device, such as a cell phone or tablet computer, and therefore power or charge a battery of the external device. In some embodiments, power electronics 116 may include a power inverter circuit 121 in order to convert alternating current (AC) electricity to direct current (DC) electricity, a voltage regulator circuit 122 in order to provide a stable DC voltage to the electrical connector 104, and/or a voltage divider circuit 123 in order to provide appropriate voltage for the LEDs.

In some embodiments, power electronics 116 may also include a toggle circuit 124 that is configured for selectively enabling one or more individual LEDs from the array of LEDs 112a-b. For instance, the circuit may operate to toggle between enabling just the white LEDs, enabling just the colored LEDs, enabling both the white and colored LEDs, and disabling both sets of LEDs. As an example, a switch may be positioned on the base 110 and coupled to the power electronics 116 via the bus 117 or other mechanism in order to selectively enable the LEDs.

In some embodiments, components 1000 may also include a rechargeable power source 119, such a lithium-ion battery or a capacitor circuit that enables the power electronics 116 to supply power to the LEDs 112 and/or an external device coupled to the electrical connector 104 when electrical connector 107 is not coupled to an external power source. In some embodiments, when electrical connector 107 is coupled to an external power source, power electronics 116 may operate to charge the rechargeable power source 119 by providing current to the rechargeable power source 119. And in some embodiments, when electrical connector 107 is not coupled to an external power source, the LEDs and/or an external device coupled to electrical connector 104 (and/or electrical connector 115) may operate to draw current from the rechargeable power source 119. It will be appreciated that other arrangements of electrical components are possible in other embodiments.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

I claim:

1. An apparatus comprising:
   a base unit that forms bottom and side surfaces of the apparatus;
   a top unit that forms a top surface of the apparatus, wherein the top unit includes a user-removable insert, the user-removable insert comprising a substantially transparent portion and a substantially opaque portion;
   one or more light emitters positioned within the base unit and configured for emitting light through the substantially transparent portion of the user-removable insert;
   a first male electrical plug protruding from the base unit and configured to couple to a first external device;
   a first female electrical receptacle recessed substantially within the base unit and configured to couple to an external power source; and
   power electronics coupled to the one or more light emitters, the first male electrical plug, and the first female electrical receptacle, the power electronics being configured to deliver electricity from the external power source to the first external device and the one or more light emitters.

2. The apparatus of claim 1, wherein the top unit includes one or pressure clips configured to lock onto a corresponding portion of the user-removable insert, and wherein the top unit includes a depressable portion, which when depressed, operates to manipulate the one or more pressure clips to release the user-removable insert.

3. The apparatus of claim 1, wherein the side surface of the base unit is substantially cylindrical and the top unit is substantially a disc covering the top surface of the apparatus, wherein the side surface includes a groove that retains at least one lip of the top unit and prevents the top unit from detaching from the base and allows the top unit to rotate within the base unit.

4. The apparatus of claim 3, wherein the at least one lip of the top unit is positioned on vertical clips extending down from the disc.

5. The apparatus of claim 3, wherein the at least one lip of the top unit is a circumferential lip extending around the perimeter of the top unit.

6. The apparatus of claim 1, wherein the male electrical plug protrudes from the side surface of the base unit, wherein the base unit is configured to allow the male electrical plug to retract into the base unit, and wherein the apparatus further comprises:
   an annular ring rotatable about an outside of the base unit side surface, the annular ring including an aperture through which the male electrical plug protrudes.

7. The apparatus of claim 1, further comprising:
   a second male electrical plug protruding from the base unit and configured to couple to a second external device;

wherein the second male electrical plug is a different plug configuration than the first male electrical plug, and wherein the power electronics are coupled to the second male electrical plug and configured to deliver electricity from the external power source to the second external device via the second male electrical plug.

8. The apparatus of claim 7, wherein the first male electrical plug and the second male electrical plug are different types of male Universal Serial Bus (USB) plugs, the types being selected from the group consisting of: Type A, Type B, Mini-A, Mini-B, Micro-A, and Micro-B.

9. The apparatus of claim 7, wherein the first and second male electrical plugs and the base unit are configured to allow the first and second male electrical plugs to protrude from the side surface of the base unit and independently retract into the base unit, and wherein the apparatus further comprises:
an annular ring rotatable about an outside of the base unit side surface, the annular ring including an aperture and being positionable such that one of the first and second male electrical plugs protrude from the base unit through the aperture and the other of the first and second male electrical plugs is retained within the base unit by the annular ring.

10. The apparatus of claim 1, further comprising:
a plug housing surrounding a radial portion of the first male electrical plug, wherein the plug housing allows the first male electrical plug to rotate about its axis within the plug housing.

11. The apparatus of claim 1, further comprising:
an illuminable portion of the side surface of the base unit configured to radiate light emitted from the one or more light emitters within the base unit onto the first male electrical plug.

12. The apparatus of claim 1, wherein the first male electrical plug is a type of male Universal Serial Bus (USB) plug, the type being selected from the group consisting of: Type A, Type B, Mini-A, Mini-B, Micro-A, and Micro-B.

13. The apparatus of claim 1, wherein the first female electrical receptacle is a type of female Universal Serial Bus (USB) receptacle, the type being selected from the group consisting of: Type A, Type B, Mini-A, Mini-B, Micro-A, and Micro-B.

14. The apparatus of claim 1, wherein the one or more light emitters include a first array of substantially white light emitting diodes (LEDs) and a second array of colored LEDs.

15. The apparatus of claim 14, further comprising:
a toggling device coupled to the first array and the second array, the toggling device being configured for selectively actuating either or both of the first array and the second array.

16. The apparatus of claim 1, wherein the power electronics include one or more of the following: a voltage regulator, a voltage divider circuit, and a power inverter circuit.

17. The apparatus of claim 16, further comprising:
a rechargeable power source positioned within the base, and
wherein the power electronics are further configured for (i) delivering electricity from the external power source to the rechargeable power source, and (ii) delivering electricity from the rechargeable power source to the one or more light emitters when the apparatus is not connected to the external power source.

18. An apparatus comprising:
a disc-shaped top unit that forms a top surface of the apparatus, wherein the top unit includes (a) a user-removable insert comprising a substantially transparent portion and a substantially opaque portion, (b) one or pressure clips configured to lock onto a corresponding portion of the user-removable insert, and (c) a depressable portion, which when depressed, operates to manipulate the one or more pressure clips to release the user-removable insert;
a base unit that forms bottom and side surfaces of the apparatus, the side surface being substantially cylindrical, wherein the side surface includes a groove that retains at least one lip of the top unit and prevents the top unit from detaching from the base and allows the top unit to rotate within the base unit, and wherein the at least one lip of the top unit is positioned on vertical clips extending down from the top unit;
one or more light emitters positioned within the base unit and configured for emitting light through the substantially transparent portion of the user-removable insert; the one or more light emitters including a first array of substantially white light emitting diodes (LEDs) and a second array of colored LEDs;
a toggling device coupled to the first array and the second array, the toggling device being configured for selectively actuating either or both of the first array and the second array;
a first male electrical plug protruding from the base unit and configured to couple to a first external device, the first male electrical plug being a type of male Universal Serial Bus (USB) plug, the type being selected from the group consisting of: Type A, Type B, Mini-A, Mini-B, Micro-A, and Micro-B;
a plug housing surrounding a radial portion of the first male electrical plug, wherein the plug housing allows the first male electrical plug to rotate about its axis within the plug housing;
an illuminable portion of the side surface of the base unit configured to radiate light emitted from the one or more light emitters within the base unit onto the first male electrical plug;
a first female electrical receptacle recessed substantially within the base unit and configured to couple to an external power source, the first female electrical receptacle being a type of female USB receptacle, the type being selected from the group consisting of: Type A, Type B, Mini-A, Mini-B, Micro-A, and Micro-B; and
power electronics coupled to the one or more light emitters, the first male electrical plug, and the first female electrical receptacle, the power electronics being configured to deliver electricity from the external power source to the first external device and the one or more light emitters, wherein the power electronics include one or more of the following: a voltage regulator, a voltage divider circuit, and a power inverter circuit.

19. The apparatus of claim 1, further comprising:
a second male electrical plug protruding from the base unit and configured to couple to a second external device;
wherein the second male electrical plug is a different plug configuration than the first male electrical plug, and wherein the power electronics are coupled to the second male electrical plug and configured to deliver electricity from the external power source to the second external device via the second male electrical plug.

20. The apparatus of claim 19, wherein the first and second male electrical plugs and the base unit are configured to allow the first and second male electrical plugs to protrude from the side surface of the base unit and independently retract into the base unit, and wherein the apparatus further comprises:
an annular ring rotatable about an outside of the base unit side surface, the annular ring including an aperture and being positionable such that one of the first and second male electrical plugs protrude from the base unit through the aperture and the other of the first and second male electrical plugs is retained within the base unit by the annular ring.

* * * * *